United States Patent
Goel et al.

(10) Patent No.: US 7,958,304 B1
(45) Date of Patent: Jun. 7, 2011

(54) DYNAMICALLY ADAPTING THE FAULT TOLERANCE AND PERFORMANCE CHARACTERISTICS OF A RAID-BASED STORAGE SYSTEM BY MERGING AND SPLITTING RAID GROUPS

(75) Inventors: Atul Goel, Foster City, CA (US); James Leong, Hillsborough, CA (US); Ratnesh Gupta, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 508 days.

(21) Appl. No.: 12/113,065

(22) Filed: Apr. 30, 2008

(51) Int. Cl.
*G06F 12/00* (2006.01)

(52) U.S. Cl. ...... 711/114; 711/170; 714/6; 714/E11.084

(58) Field of Classification Search .................. 711/112, 711/114, 170; 714/6, E11.084, E11.034
See application file for complete search history.

(56) References Cited

U.S. PATENT DOCUMENTS

| | | | | |
|---|---|---|---|---|
| 5,708,769 | A * | 1/1998 | Stallmo | 714/6 |
| 6,154,853 | A * | 11/2000 | Kedem | 711/114 |
| 7,493,514 | B2 * | 2/2009 | Soran et al. | 714/6 |
| 7,516,355 | B2 * | 4/2009 | Noya et al. | 711/114 |
| 2005/0182992 | A1 * | 8/2005 | Land et al. | 714/701 |
| 2007/0294476 | A1 * | 12/2007 | Corn et al. | 711/114 |
| 2008/0147973 | A1 * | 6/2008 | Gruttadauria et al. | 711/114 |

* cited by examiner

*Primary Examiner* — Pierre-Michel Bataille
(74) *Attorney, Agent, or Firm* — Blakely, Sokoloff, Taylor & Zafman LLP (57) ABSTRACT

Redundant Array of Inexpensive Disks (RAID) groups in a storage system are dynamically reconfigured by merging and splitting the RAID groups. When an indication of a change to data or system characteristics is received, disks in the RAID groups of the storage system can be reorganized to adapt to the change.

15 Claims, 9 Drawing Sheets

|       | RAID GROUP 410 |   |    |    |    |                 |       |   | RAID GROUP 420 |    |    |    |    |    |    |                 |   |       | RAID GROUP 430 |   |    |    |    |    |    |    |    |                  |
|-------|----------------|---|----|----|----|-----------------|-------|---|----------------|----|----|----|----|----|----|-----------------|---|-------|----------------|---|----|----|----|----|----|----|----|------------------|
| DBN   | 0              | 8 | 16 | 24 | 32 | PARITY<br>DISK  | DBN   | 40| 48             | 56 | 64 | 72 | 80 |    |    | PARITY<br>DISK  |   | DBN   | 0              | 8 | 16 | 24 | 32 | 40 | 48 | 56 | 64 | 72 | 80 | PARITY<br>DISKS |
| 0     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 1     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 2     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 3     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 4     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 5     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 6     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| 7     | A              | A | A  | A  | A  | P1              |       | B | B              | B  | B  | B  | B  |    |    | P2              |   |       | A              | A | A  | A  | A  | B  | B  | B  | B  | B  | B  | P Q              |
| STRIPE| DATA DISKS     |   |    |    |    |                 |       |   | DATA DISKS     |    |    |    |    |    |    |                 |   |       | DATA DISKS     |   |    |    |    |    |    |    |    |                  |

DYNAMICALLY ADAPTING THE FAULT TOLERANCE AND PERFORMANCE CHARACTERISTICS OF A RAID-BASED STORAGE SYSTEM BY MERGING AND SPLITTING RAID GROUPS

FIELD OF THE INVENTION

The invention in general pertains to a fault-tolerant storage system, and more particularly, to the dynamic reconfiguration of RAID-based disk arrays in a storage system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2007, NetApp, Inc., All Rights Reserved.

BACKGROUND

A Redundant Array of Inexpensive Disks (RAID) array distributes data across several physical disks and uses parity bits to protect data from corruption. Conventionally, a RAID disk array uses a single parity disk to provide data protection against a single event, which can be either a complete failure of one of the constituent disks or a bit error during a read operation. In either event, data can be re-created using both the parity and the data remaining on unaffected disks in the array.

The development of disk drive technologies produces a new generation of disk drives that have large capacity, high mean-time-to-failure (MTTF) and high bit error rate. An example of the disk drives includes the Serial Advanced Technology Attachment (SATA) drives. The widespread acceptance of the SATA drives has resulted in the development and use of double-parity RAID (RAID-DP). RAID-DP adds a second parity disk to each RAID group in order to provide data protection against the failure of two disks in the same RAID group. The fault tolerance level (e.g., RAID-DP vs. RAID-4) required by data is often based on the criticality of data. For example, a system administrator may determine the fault tolerance level based on the mean-time-to-data-loss (MTTDL) requirement in the system specification.

In determining which fault tolerance level to use for stored data, a system administrator has to strike a delicate balance between fault tolerance characteristics and performance/capacity overhead for each RAID type. The RAID types include mirrored RAID type (e.g., RAID-41, RAID-51, RAID-DP1, RAID-01), unmirrored RAID types (e.g., RAID-4, RAID-5, RAID-DP, RAID-0), and other variants. Each RAID type protects data against a fixed amount of fault with a fixed number of parity bits. However, storage of parity bits incurs capacity overhead and update to the parity bits incurs performance overhead.

After a RAID type is determined for a storage system, characteristics of the data and the storage system may change over time. In one scenario, the data may become not so critical as to warrant a RAID type having a high level of fault tolerance. Since higher fault tolerance typically implies larger RAID groups, simply removing a parity disk is generally insufficient. Rather, the data-to-parity ratio needs to be rebalanced to ensure that the Mean Time to Data Loss (MTTDL) is within acceptable bounds. In another scenario, additional disks may be installed in the storage system to provide storage for more parity data. In yet another scenario, an increase in small-write operations may warrant a decrease in the number of disks in each RAID group. Small-write operations refer to writing an amount of data that is smaller than a full stripe across all disks in a RAID group. Instead of writing a full stripe of data and parity, a small write operation involves reading the parity, writing data and updating the parity, and, therefore, increases performance overhead. Decreasing the number of disks in each RAID group reduces the stripe size, which in turn reduces the occurrence of small-write operations.

When data or system characteristics change, current RAID groups cannot be easily reconfigured to adapt to the change. Reconfiguration operations often incur system downtime and have a negative impact on system performance.

SUMMARY OF THE INVENTION

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

Redundant Array of Inexpensive Disks (RAID) groups in a storage system are dynamically reconfigured by merging and splitting the RAID groups. When an indication of a change to data or system characteristics is received, disks in the RAID groups of the storage system can be reorganized to adapt to the change.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Dynamic reconfiguration of Redundant Array of Inexpensive Disks (RAID) groups in a storage subsystem is described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

A storage subsystem includes a plurality of storage devices (e.g., disks) organized as RAID groups for fault tolerance. These RAID groups are dynamically reconfigured during operations of the storage subsystem. The reconfiguration may involve changes in the number of disks in the RAID groups, the fault-tolerance level of the RAID groups, or the data-to-parity ratio of the RAID groups. The dynamic reconfiguration of RAID groups is performed to adapt the RAID groups to changes in data and system characteristics. The dynamic reconfiguration includes merging and splitting RAID groups without incurring system downtime. Merging or splitting RAID groups changes fault tolerance and performance characteristics of the RAID groups, and, therefore, adapts the RAID groups to the changes in data and system characteristics.

Operations described herein can be used to seamlessly upgrade or downgrade between different fault tolerance levels within the permissible capacity and performance overhead of the system. The term "fault tolerance level" herein refers to the number of parity disks used by a RAID group, as well as the data-to-parity ratio in the RAID group. Further, operations described herein can also be used for decommissioning disks from an aggregate (a pool or a container of disks, which will be further explained below). This feature allows administrators to free disks within RAID groups or aggregates that have under-utilized storage.

Additionally, a RAID group can be reconfigured concurrently with I/O operations on the RAID group. When a merge/split operation is performed on a first stripe of the RAID group, an I/O operation (such as read or write) can be performed on a second stripe of the same RAID group. The term "stripe" herein refers to a row of disk blocks across all of the disks in a RAID group. Thus, the merge/split operation incurs minimal impact on the system.

Before further discussing details of the dynamic RAID group reconfiguration, it is useful to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). In the descriptions that follow, RAID groups are implemented under an aggregate, which is sometimes referred to as a disk container that contains a set of disks.

Figure 1:
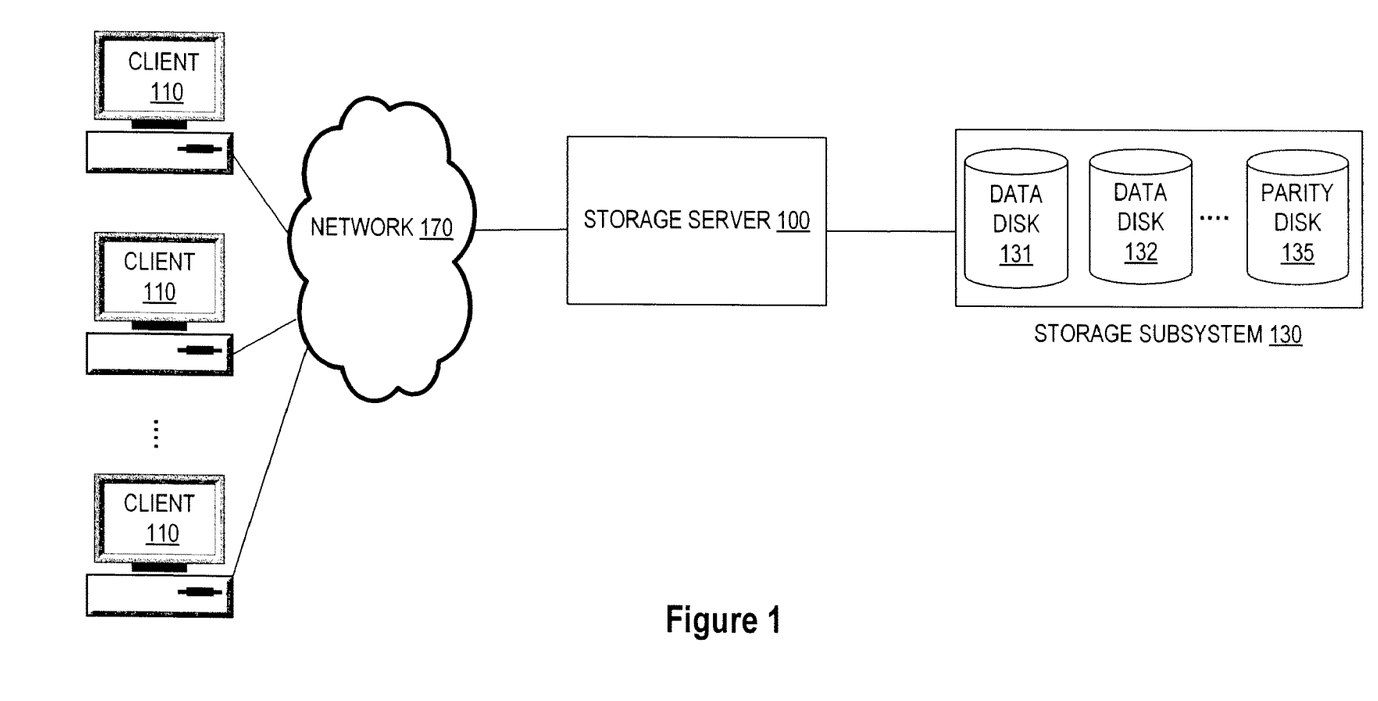
FIG. 1 illustrates a network environment which includes a storage server coupled to a storage subsystem.

FIG. 1 shows an example of a network environment in which a storage server 100 operates. The storage server 100 can be a file server or "filer," in which the dynamic RAID group reconfiguration described herein can be implemented. It should also be noted that the dynamic RAID group reconfiguration described herein can be applied in other types of storage systems, such as storage servers, which provide clients with either or both of block-level access and file-level access to stored data or processing systems other than storage servers, and network devices configured to provide storage services.

Referring to FIG. 1, the storage server 100 is coupled to a storage subsystem 130 which includes an array of mass storage devices (e.g., disks), and to a set of storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server 100. The storage server 100 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Data stored in the storage subsystem 130 is protected against corruption by the use of parity bits. In one embodiment, the parity bits are stored in one or more designated parity disks (such as parity disk 135) that are separated from data disks 131 and 132. Thus, RAID arrays that use a distributed parity organization, such as RAID-5 where parity and data are intermixed on all disks, cannot be used in the storage subsystem 130. This is because the use of distributed parity imposes significant obstacles to changing the fault tolerance level. With RAID-5 arrays, fault tolerance level cannot be changed by adding or removing a parity disk.

Although illustrated as a self-contained element, the storage server 100 may have a distributed architecture; for example, it may include a separate N—("network") module and D—("data") module (not shown). In such an embodiment, the N-module is used to communicate with clients 110, while the D-module includes the file system functionality and is used to communicate with an associated one of the storage subsystems 130. The N-module and D-module can communicate with each other using an internal protocol. Alternatively, the storage server 100 may have an integrated architecture, where the network and data components are all contained in a single box. The storage server 100 may also be coupled through a switching fabric to other similar storage servers (not shown) which have their own local storage subsystems. In this way, all of the storage subsystems 130 can form a single storage pool, to which any client of any of the storage servers has access.

Illustratively, the storage server 100 may be a storage server product of NetApp Inc., Sunnyvale, Calif., that uses the NetApp® Data ONTAP® storage operating system. However, it is expressly contemplated that any appropriate storage server and storage operating system may be enhanced for use in accordance with the dynamic reconfiguration of RAID groups described herein.

Figure 2:
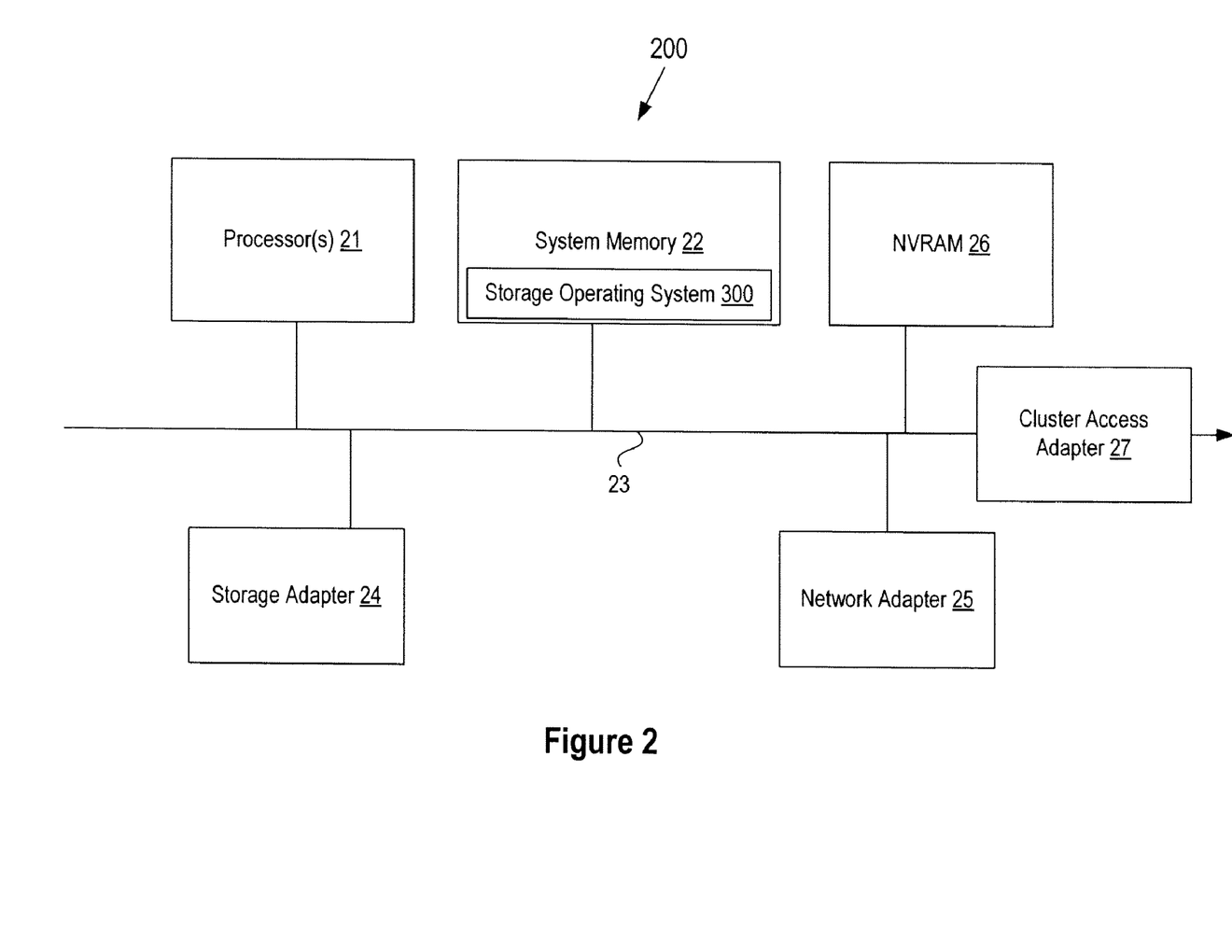
FIG. 2 illustrates an example of the hardware architecture of a storage server.

FIG. 2 is a block diagram showing an example of the architecture of the storage server 100 at a high level. Certain standard and well-known components, which are not germane to the present invention, are not shown. The storage server 100 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the storage server 100 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory (i.e., the "system memory") of the storage server 100. Memory 22 represents any form of random access memory (RAM), read-only memory (ROM), flash memory, or the like, or a combination of such devices. In one embodiment, memory 22 stores (among other things) a storage operating system 300, which can implement the dynamic reconfiguration described herein.

Also connected to the processors 21 through the bus system 23 are a storage adapter 24, a network adapter 25 and a cluster access adapter 27. The storage adapter 24 allows the storage server 100 to access the storage subsystem 130 of FIG. 1, and may be, for example, a Fibre Channel adapter or a SCSI adapter. The network adapter 25 provides the storage server 100 with the ability to communicate with remote devices, such as the clients 110, over a network and may be, for example, an Ethernet adapter, a Fibre Channel adapter, or the like. The cluster access adapter 27 couples the storage server 100 to other nodes of the cluster over a cluster switching fabric.

The storage server 100 also includes non-volatile random access memory (NVRAM) 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array.

Figure 3:
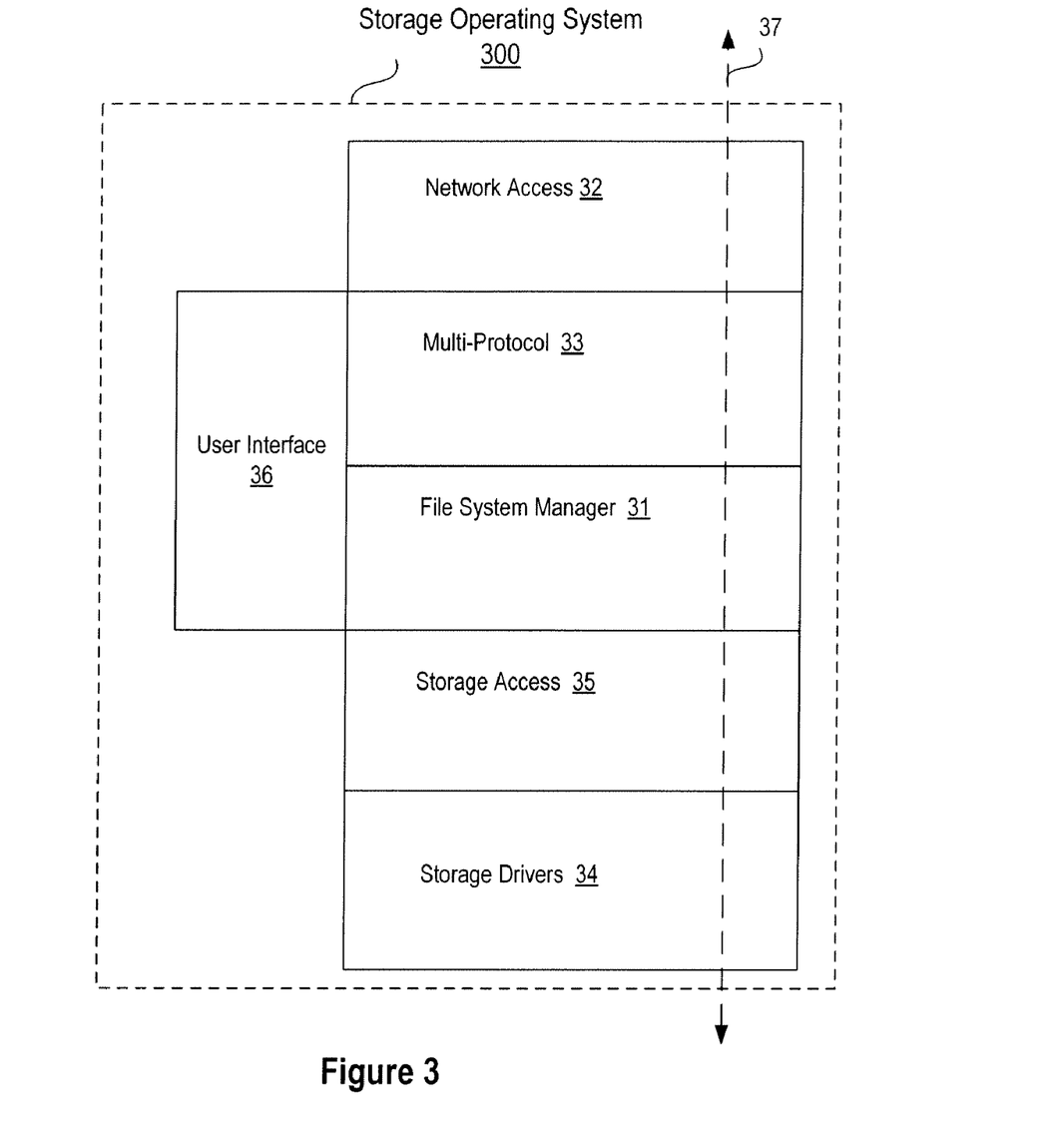
FIG. 3 illustrates the architecture of an operating system of the storage server according to an embodiment of the invention.

FIG. 3 illustrates an example of the storage operating system 300 for controlling the operations of the storage server 100. The storage operating system 300 and its constituent elements are preferably implemented in the form of software. However, in some embodiments, some or all of the elements of the operating system may be implemented in the form of hardware (e.g., specially designed circuitry), or as a combination of hardware and software. As will be described in greater detail below, in one embodiment, the storage operating system 300 manages a disk-topology aware file system, where the volume block number (VBN) space is formed by concatenating disk block numbers (DBNs) on each disk in the volume. The term "VBN" herein refers to a physical volume number (PVBN), which is the volume block number maintained within a traditional volume. A traditional volume has a fixed, one-to-one relationship with the underlying physical storage (aggregate).

To reconfigure a RAID group, the disks within different RAID groups are rearranged. The storage operating system 300 achieves this reconfiguration by merging RAID groups or splitting a RAID group into multiple RAID groups, followed by recomputing the parity.

As shown, the storage operating system 300 includes several modules, or "layers". These layers include a file system manager 31. The file system manager 31 is software that manages the one or more file systems managed by the storage server 100. In particular, the file system manager 31 imposes a hierarchy (e.g., a directory/file structure) on the data stored in the storage subsystem 130. For example, each "on-disk" file may be implemented as set of data structures, i.e., disk blocks, configured to store information, such as the actual data for the file. These data blocks are organized within a volume block number (VBN) space that is maintained by the file system. The file system manager 31 also manages client-initiated read and write operations at a high level, while delegating certain functions to lower layers of the storage operation system 300.

To allow the storage server 100 to communicate over the network 170 (e.g., with clients 110), the operating system 300 also includes a network access layer 32, and a multi-protocol layer 33 operatively coupled between the file system manager 31 and the network access layer 32. The multi-protocol layer 33 includes a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage server 100 to communicate with the storage subsystem 130, the storage operating system 300 includes a storage driver layer 34, and a storage access layer 35 operatively coupled between the file system manager 31 and the storage driver layer 34. The storage access layer 35 implements a higher-level disk storage protocol, such as RAID-4 or RAID-DP, while the storage driver layer 34 implements a lower-level storage device access protocol, such as Fibre Channel Protocol (FCP) or SCSI. The storage access layer 35 can alternatively be called the "RAID layer."

Also shown in FIG. 3 is the path 37 of data flow, through the operating system 300, associated with a client-initiated read or write request. The storage operating system 300 also includes a user interface 36 to generate a command line interface (CLI) and/or graphical user interface (GUI), to allow administrative control and configuration of the storage server 100, from a local or remote terminal.

Figure 4:
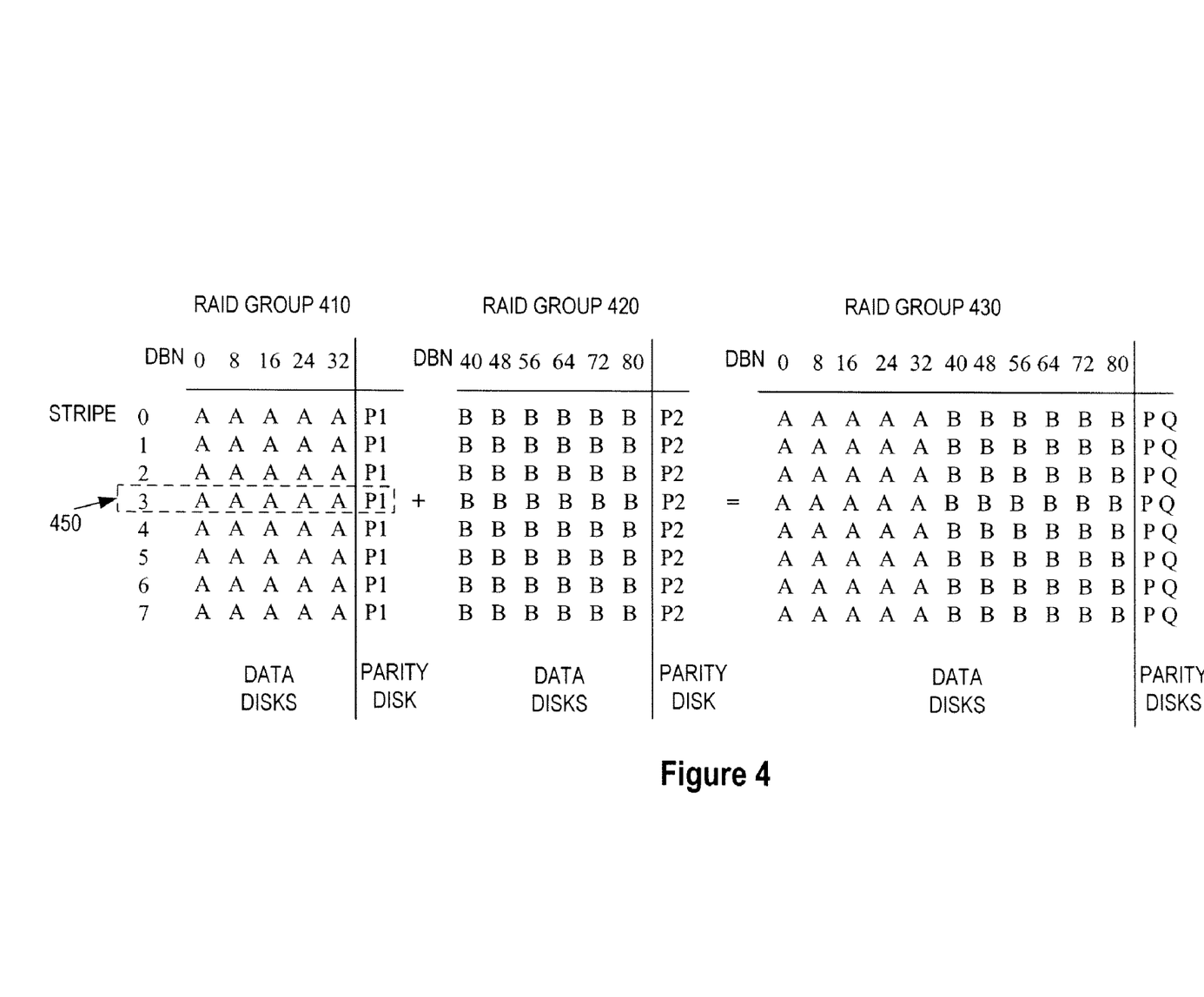
FIG. 4 illustrates an example of merging two single-parity RAID groups into a double-parity RAID group.

FIG. 4 is a diagram showing an example of merging two RAID groups 410 and 420 into a new RAID group 430 performed by the storage server 100 of FIG. 1. This example illustrates a scenario where the merge is performed to change the fault tolerance levels of the RAID groups 410 and 420 from RAID-4 to RAID-DP. However, it is understood that the merging of RAID groups can be performed using the operations described herein without changing the fault tolerance levels of the participating RAID groups. It is also understood that the fault tolerance levels of the original RAID groups (in this example, the RAID groups 410 and 420) and the resulting RAID groups (in this example, the RAID group 430) can be any RAID protocol, as long as the parity bits are stored in one or more designated parity disks.

In the example of FIG. 4, the RAID group 410 contains five data disks A and a parity disk P1. The RAID group 420 contains six data disks B and a parity disk P2. The new RAID group 430 contains five data disks A, six data disks B and two parity disks P and Q. Each disk contains eight disk blocks. The disks in the RAID groups 410 and 420 have consecutive disk block numbers (DBNs) from 0 to 87 (the last disk B in RAID group 420 begins at DBN 80 and ends at DBN 87), which are concatenated to form a volume block number (VBN) space.

In the above example, each of the RAID groups 410, 420 and 430 contains seven stripes. An example of a stripe in the RAID group 410 is a stripe 450. The stripes in the RAID group 430 are created by collecting data blocks from both RAID groups 410 and 420, and then computing new parity blocks P and Q. While the merge operation is in progress, the fault tolerance level for the blocks in the RAID groups 410 and 420 depends upon their membership in the new set of stripes. Blocks in the stripes which have already been merged have a fault tolerance level equal to that of the resulting group, and blocks in the stripes which have not yet been merged retain their original fault tolerance level.

FIG. 4 also shows the result of merging on the VBN arrangement on each disk. The VBN space exported by the resulting RAID group 430, is the sum of VBN spaces exported by RAID groups 410 and 420. Further, the VBN space on each data disk remains intact and does not change during the merge process. As a result, it is not necessary to perform cumbersome data copying or data movement.

Figure 5:
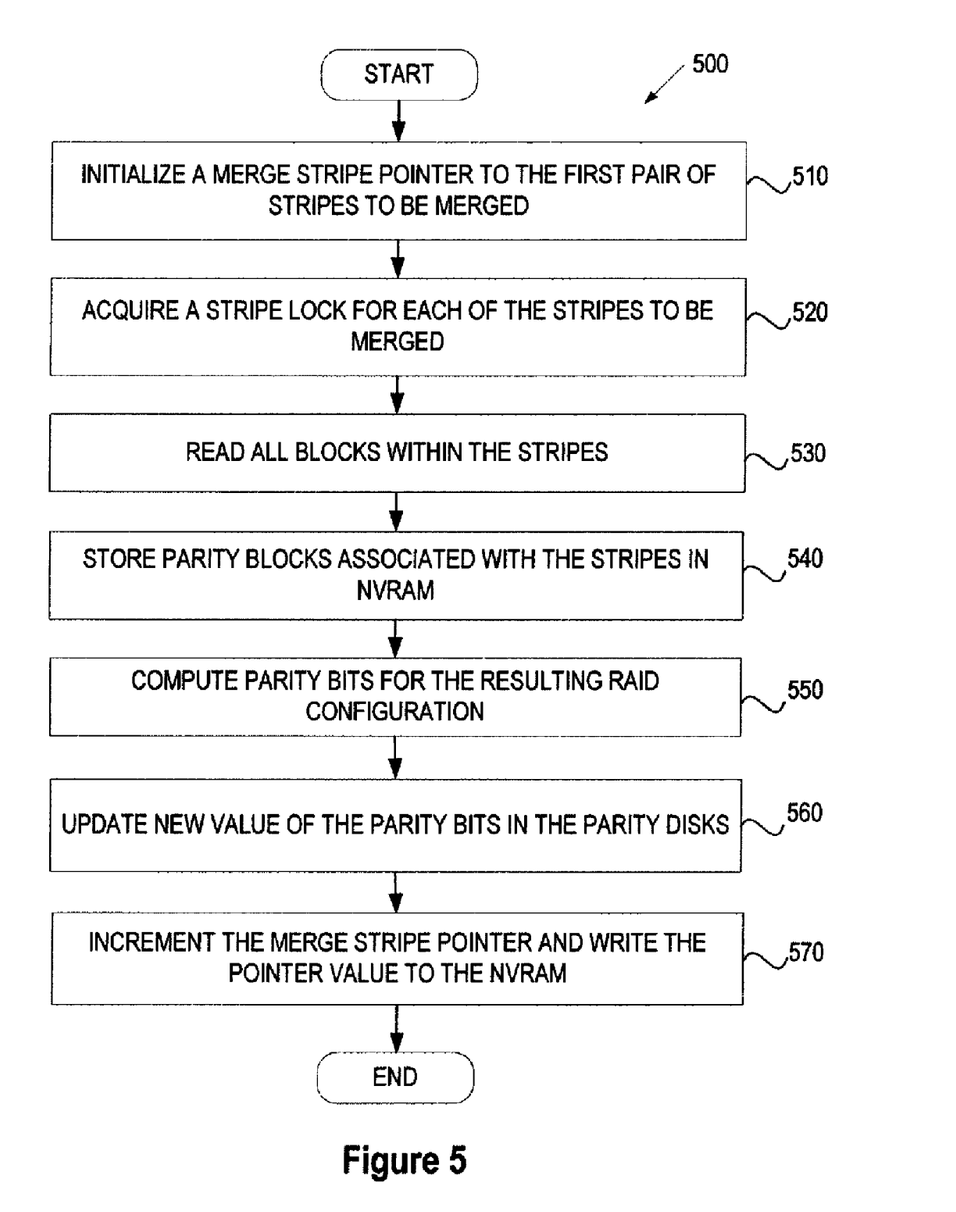
FIG. 5 is a flow diagram illustrating an embodiment of a merge process.

FIG. 5 is a flowchart illustrating a merge process 500 for merging two RAID groups in accordance with an embodiment of the present invention. Details not germane to the present invention are omitted from the following description. The merge process 500 generates one stripe for a resulting RAID group at a time. The merge process 500 may be performed by hardware or software. In one embodiment, the merge process 500 is performed by the storage access layer 35 in the storage operating system 300 of FIG. 3. The merge process 500 may be initiated in response to an indication of a change to data or system characteristics of a storage system, such as data criticality, capacity overhead requirements, system performance requirements, or the like. The indication of change may be sent by a system administrator.

Referring to FIG. 5, at block 510, a merge stripe pointer is initialized to the first pair of stripes to be merged. At block 520, a stripe lock is acquired for each of the stripes to be merged. At block 530, all of the blocks within these stripes are read. At block 540, the parity blocks associated with these stripes are stored in a non-volatile memory, e.g., the NVRAM 26 of FIG. 2 to allow parity recovery in the event of system failure during the merge process. If the storage server 100 operates in a clustered environment, the parity blocks can also be stored in the NVRAM of one or more remote storage servers in the cluster. At block 550, the parity bits for the resulting RAID configuration are computed. Illustratively, if two RAID-4 groups are merged to form a RAID-DP group, the row parity bits and diagonal parity bits will be computed. If two RAID-4 groups are merged to form a larger RAID-4 group, the parity bits of the resulting RAID-4 group will be computed. At block 560, new values of the parity bits are updated in the parity disks. It is noted that the merge operations may include adding an additional parity disk to, or freeing a parity disk from, the original RAID groups. At block 570, the merge stripe pointer is incremented and is written to the NVRAM 26 of the storage server 100.

It is noted that the merge process 500 may involve adding or freeing a parity disk. Whether the merge causes a new parity disk to be added or removed depends upon the RAID levels of the original RAID groups and that of the merged group. In one scenario, if two RAID-4 groups are merged to a RAID-DP group, then no new parity disk is necessary. The original parity disks belonging to the two RAID-4 groups can be used to store the row and diagonal parity bits for the merged stripes of the resulting merged group. In another scenario, two RAID-4 groups may be merged to form a RAID-TP group (referring to "RAID Triple Protection," which offers triple disk failure protection). In this scenario, adding a new parity disk becomes necessary, as every merged stripe needs three parity blocks. In yet another scenario, if two RAID-4 groups are merged to form another RAID-4 group, one of the parity disks can be freed at the end of the merge process.

In an alternate embodiment, the merge process can be performed by storing the newly computed parity bits on a totally new set of spare disks. At the end of the merge process, the old parity disks can be freed and replaced by the new set of parity disks. The number of the old set of parity disks and the number of the new set of parity disks are determined by the RAID levels of the original and final RAID groups.

Referring again to the example of FIG. 4, the RAID group 430 can be split into the RAID groups 410 and 420 using a split process that performs the reverse of merge operations. The split process may be performed by the storage access layer 35 in the storage operating system 300 of FIG. 3. Illustratively, the fault tolerance level of each of the RAID groups 410 and 420 decreases during the split process from RAID-DP to RAID-4. However, it is understood that the splitting of RAID groups can be performed using the operations described herein without changing the fault tolerance levels of the participating RAID groups. It is also understood that the fault tolerance levels of the original RAID groups (e.g., the RAID group 430) and the resulting RAID groups (e.g., the RAID groups 410 and 420) can be any RAID protocol, as long as the parity bits are stored in one or more designated parity disks.

Figure 6:
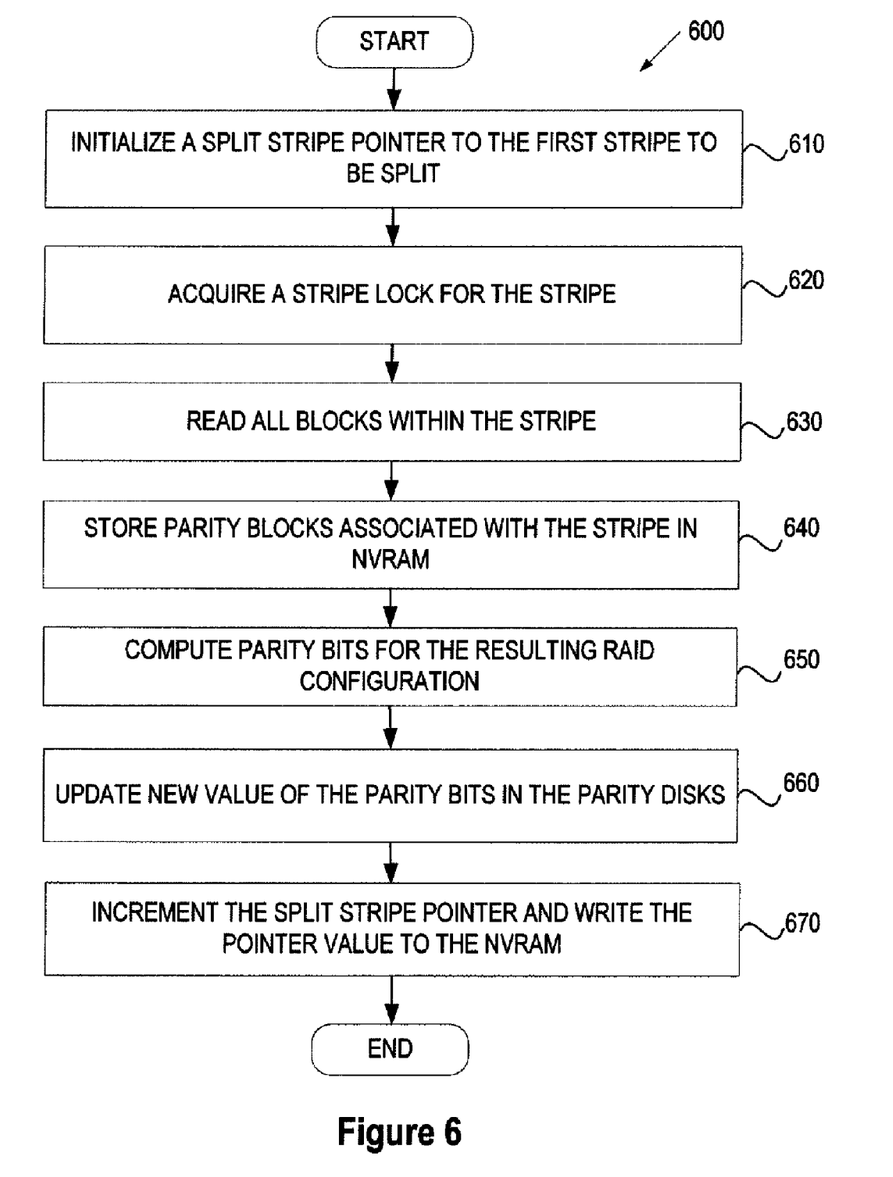
FIG. 6 is a flow diagram illustrating an embodiment of a split process.

FIG. 6 is a flowchart illustrating a split process 600 for splitting a RAID group into two RAID groups in accordance with an embodiment of the present invention. Details not germane to the present invention are omitted from the following description. The split process 600 splits one stripe of a RAID group at a time. The split process 600 may be performed by hardware or software. In one embodiment, the split process 600 is performed by the storage access layer 35 in the storage operating system 300 of FIG. 3. The split process 600 may be initiated in response to an indication of a change to data or system characteristics of a storage system, such as data criticality, capacity overhead requirements, system performance requirements, or the like. The indication of change may be sent by a system administrator.

At block 610, a split stripe pointer is initialized to the first stripe to be split. At block 620, a stripe lock is acquired for the stripe. At block 630, all of the blocks within the stripe are read. At block 640, the parity blocks associated with the stripe are stored in a non-volatile memory, e.g., the NVRAM 26 of FIG. 2 to allow data recovery in the event of system failure during the merge process. If the storage server 100 operates in a clustered environment, the parity blocks can also be stored in the NVRAM of one or more remote storage servers in the cluster. At block 650, the parity bits for the resulting RAID configuration are computed. Illustratively, if a RAID-DP group is split into two RAID-4 groups, the row parity bits for each of the two RAID-4 groups will be computed. At block 660, new values of the parity bits are updated in the parity disks of each of the resulting RAID groups. It is noted that the split operations may include adding an additional parity disk to, or freeing a parity disk from, the original RAID group. At block 670, the split stripe pointer is incremented and is written to the NVRAM 26 of the storage server 100.

As noted above in connection with the merge process 400, the addition or removal of a parity disk depends upon the RAID levels of the original and final RAID groups. In the example described in FIG. 4, a parity disk is neither added nor freed when splitting the RAID-DP group 430 into two RAID-4 groups 410 and 420. This is because the parity bits for the split stripes can be stored on the two parity disks of the original RAID-DP group 430. If a large RAID-4 group is being split into two smaller RAID-4 groups, then adding a new parity disk is necessary.

As described above, the merge/split operations modify the structure of a RAID group to satisfy the required fault tolerance, performance, and capacity overhead characteristics. The dynamic reconfiguration of RAID groups provides a simple management approach to transparently adapt a disk array configuration to different RAID types and fault tolerance levels, depending upon the nature of user/client workload and the requirements on system performance and availability. Further, the merge/split operations do not change the allocations of volume block numbers (VBNs) to disks. Thus, the operations involve no data migration and remapping, and, therefore, have minimal performance impact on the operations of a storage system.

The merge/split operations described above have many notable features. In one scenario, the fault tolerance level of the RAID groups before and after the reconfiguration may stay the same. Illustratively, two RAID-4 groups may be merged into one RAID-4 group. In another scenario, the fault tolerance level of the RAID groups may be upgraded from a single parity (e.g., RAID-4) configuration to a double parity (e.g., RAID-DP) configuration, or downgraded from a double parity (RAID-DP) configuration to a single parity (RAID-4) configuration. Downgrades can serve to reclaim valuable data capacity when converting a non-mirrored RAID array to a mirrored configuration. Illustratively, the fault tolerance provided by mirrored RAID-4 is generally better than that of RAID-DP. Thus, a RAID-DP group may be downgraded/converted to into a mirrored RAID-4 by first converting the RAID-DP group into a mirrored RAID-DP group, followed by downgrading the mirrored RAID-DP group to a mirrored RAID-4 group.

The merge/split operations not only adjust fault tolerance levels when necessary, but also change the data-to-parity ratio in a RAID group. Data-to-parity ratio refers to the number of data bits vs. the number of parity bits in a RAID group. Requirement changes that have an impact on fault tolerance, performance or capacity utilization typically call for changes to the data-to-parity ratio. Illustratively, a storage server typically uses a number of loops to connect to the disks within the storage subsystem (e.g., the storage subsystem 130 of FIG. 1). The term "loop" herein refers to a network for connecting multiple disks. The network may utilize protocols such as Small Computer System Interface (SCSI), Fibre Channel (FC), Internet SCSI (iSCSI), Serial Attached SCSI (SAS), and the like. When allocating disks to a RAID group, a common practice is that the number of disks from each loop is no more that the fault-tolerance level of the RAID group. Thus, according to the common practice, no two disks in a RAID-DP group would fall on the same loop. The number of loops, in this case, constrains the number of disks in each RAID group, as well as the data-to-parity ratio. Adding loops to a storage server allows for an increase in the number of disks within a RAID group, thus improving the data-to-parity ratio and decreasing capacity wastage. When the number of loops in a storage system is changed, merging/splitting a RAID group adapts the RAID group to the changes of the data-to-parity ratio in the system.

The merge/split operations adjust the fault tolerance level and data-to-parity ratio of a RAID group without wasting capacity. For example, as RAID-DP provides a higher level of fault tolerance than RAID-4, a customer may wish to configure a larger number of data drives in a RAID group in a RAID-DP configuration. However, if a RAID group is upgraded from RAID-4 to RAID-DP by simply adding an extra parity drive to the RAID group, a customer will not be able to configure more data drives into the upgraded RAID group. The resulting RAID-DP group may introduce capacity wastage due to the high parity-to-data ratio (or low data-to-parity ratio). Merging/splitting allows a customer to dynamically alter the parity-to-data ratio.

The merge/split operations can also help reclaim unused disk capacity by decommissioning disks from an aggregate. Illustratively, a file system can reorganize data within an aggregate by moving all allocated blocks from a set of disks to be decommissioned. Once the set of disks are free of any allocated data, the RAID group containing these disks can be split into two parts—one containing data disks which are still in use, and another containing the set of disks not being used by the file system. At the end of the split process, the RAID group consisting of the unused disks can be freed, thus freeing capacity.

The merge/split operations are seamless to RAID clients, e.g., such as a Write-Anywhere-File-Layout (WAFL) file system, which is implemented on the NetApp® Data ONTAP® storage operating system. Further, extra disks are added to a RAID group only when necessary. Thus, it is not necessary to add an extra disk when merging two RAID-4 groups to a single RAID-DP group. However, additional disks may be needed when splitting a RAID group into two smaller groups of the same RAID type, e.g. splitting a RAID-4 group into two RAID-4 groups. Additionally, during the merge/split process, the fault tolerance level of each stripe is consistent with the RAID configuration of the stripe. Stripes that have already been merged or split have a fault tolerance level at least as high as the resulting RAID group. Stripes not yet been merged or split have a fault tolerance level at least as high as the original RAID configuration.

Moreover, the merge/split operations can start even if a participating RAID group is in a degraded state. This scenario may occur if a disk fails during the merge process. A split operation can continue if a RAID-DP group is degraded or doubly degraded with only one missing disk in each resulting RAID group.

Embodiments of the invention can be applied to storage systems which use a disk-topology aware file system, such as a WAFL file system. The ZFS file system by Sun Microsystems, Inc. is another example of a disk-topology aware file system. Other disk-topology aware file system may also exist. The file system relies on a detailed knowledge of the physical data layout and, therefore, is capable of intelligently using the disks. The file system allows dynamic modification of the configuration of a RAID group without remapping the address space, and therefore, does not incur system downtime during reconfiguration. The file system also provides flexibility for the underlying RAID sub-system to export the disk address space in a manner that supports the easy addition and combination of disks. An allocation address space can be created by logically concatenating disks within RAID groups. Since the file system has a detailed knowledge of the number of disks within each RAID group and the address space exported by each disk, the file system can easily reduce the overhead incurred by parity updates by allocating as many blocks within a stripe as possible. In addition, the addressing scheme used by the file system can be easily adapted to a new configuration with more or fewer disks in the RAID group without incurring a performance penalty. In the scenario of the WAFL file system, the write-out-of-place nature of the WAFL also allows the use of dedicated parity disks in RAID configurations such as RAID-4 and RAID-DP. Such configurations make it possible to merge and split RAID groups without resorting to expensive copy operations.

The merge/split operations may be performed concurrently with I/O operations. When two RAID groups are merged into one RAID group, the stripes that have already been merged belong to a logical stripe group ("a super-stripe group"), and the stripes of the two original RAID groups that have not yet been merged belong to two other logical stripe groups. When a RAID group is split into two RAID groups, the stripes of the original RAID group that have not yet been split belong to one logical stripe group, and the stripes that have already been split belong to two other logical stripe groups ("sub-stripe groups"). Thus, for the purpose of merge/split operations, a RAID group can be divided into multiple sub-stripe groups, and multiple RAID groups can be merged into a super-stripe group.

A stripe group has the following properties. 1) A sub-stripe group can be formed using the stripes from only a subset of the disks within a RAID group. 2) A super-stripe group is formed using the stripes of all disks of the RAID groups to be merged. 3) Each stripe can be a member of only one sub-stripe (or super-stripe) group. 4) A stripe group has a state which describes the configuration of its constituent stripes. 5) For any stripe group, the constituent stripes are derived from the same set of disks. 6) Disks can be members of one or more stripe groups. 7) Stripes can be dynamically added and deleted from stripe groups. It is understood that additional properties may exist.

Figure 7A:
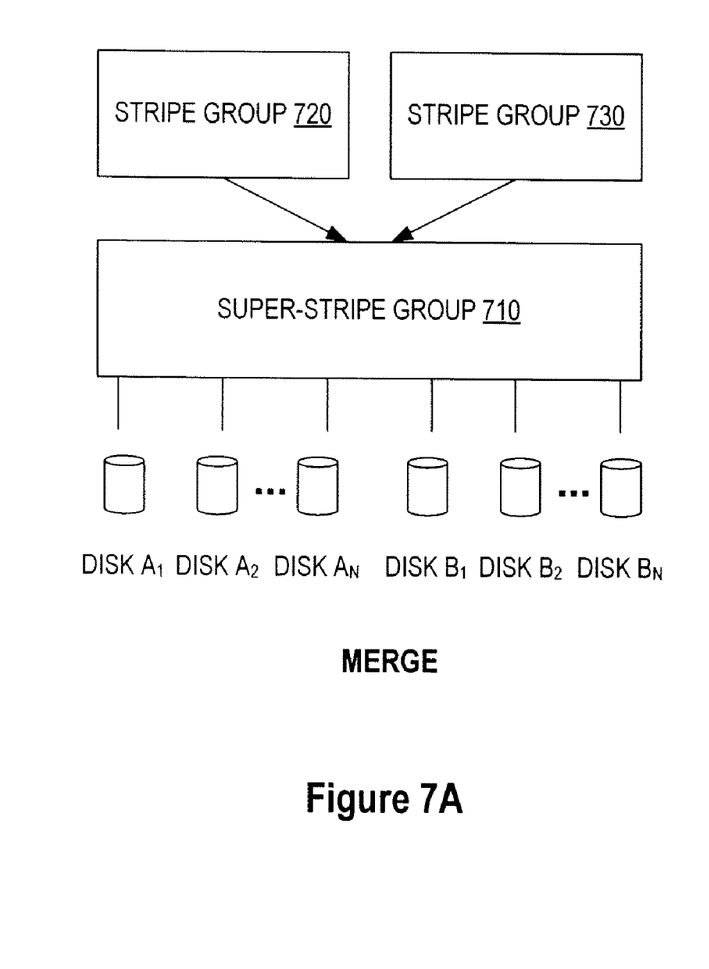
FIG. 7A is a diagram of an example of a super-stripe group.
Figure 7B:
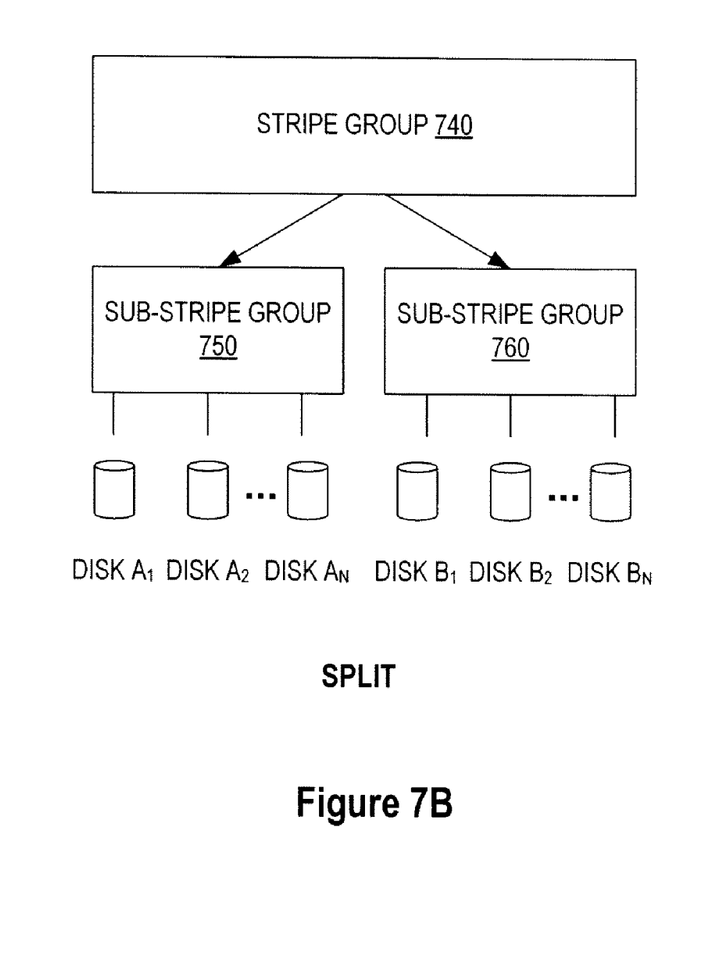
FIG. 7B is a diagram of an example of sub-stripe groups.

FIG. 7A shows the relationship between a super-stripe group 710 and its constituent stripe groups 720 and 730 within a RAID object hierarchy when merging two RAID groups into one RAID group. The stripe group 720 contains stripe blocks from disks $A_1, A_2, \ldots, A_N$, and the stripe group 730 contains stripe blocks from disks $B_1, B_2, \ldots, B_N$. The super-stripe group 710 contains stripe blocks from both disks $A_1$, and disks $B_1, B_2, \ldots, B_N$. FIG. 7B shows the relationship between a stripe group 740 and its sub-stripe groups 750 and 760 when splitting a RAID group into two RAID groups. The stripe group 740 contains stripe blocks from both disks $A_1$, $A_2, \ldots, A_N$ and disks $B_1, B_2, \ldots, B_N$. The sub-stripe group 750 contains stripe blocks from disks $A_1$, and the sub-stripe group 760 contains stripe blocks from disks $B_1, B_2, \ldots, B_N$.

A stripe group has states that describe the RAID configuration of its constituent stripes. Fully formed RAID-0, RAID-4 and RAID-DP groups contain only one stripe group that includes all of the stripes. Illustratively, when merging two RAID-4 groups into a RAID-DP group, three stripe groups are formed, including one RAID-DP super-stripe group and two RAID-4 stripe groups. The RAID-DP stripe group includes the stripes that have already been merged. All disks within the merged RAID group are members of the RAID-DP stripe group. The two RAID-4 stripe groups include the stripes that have not yet been merged. Disk membership within the RAID-4 stripe groups is based on the membership within the original RAID-4 groups.

Figure 8:
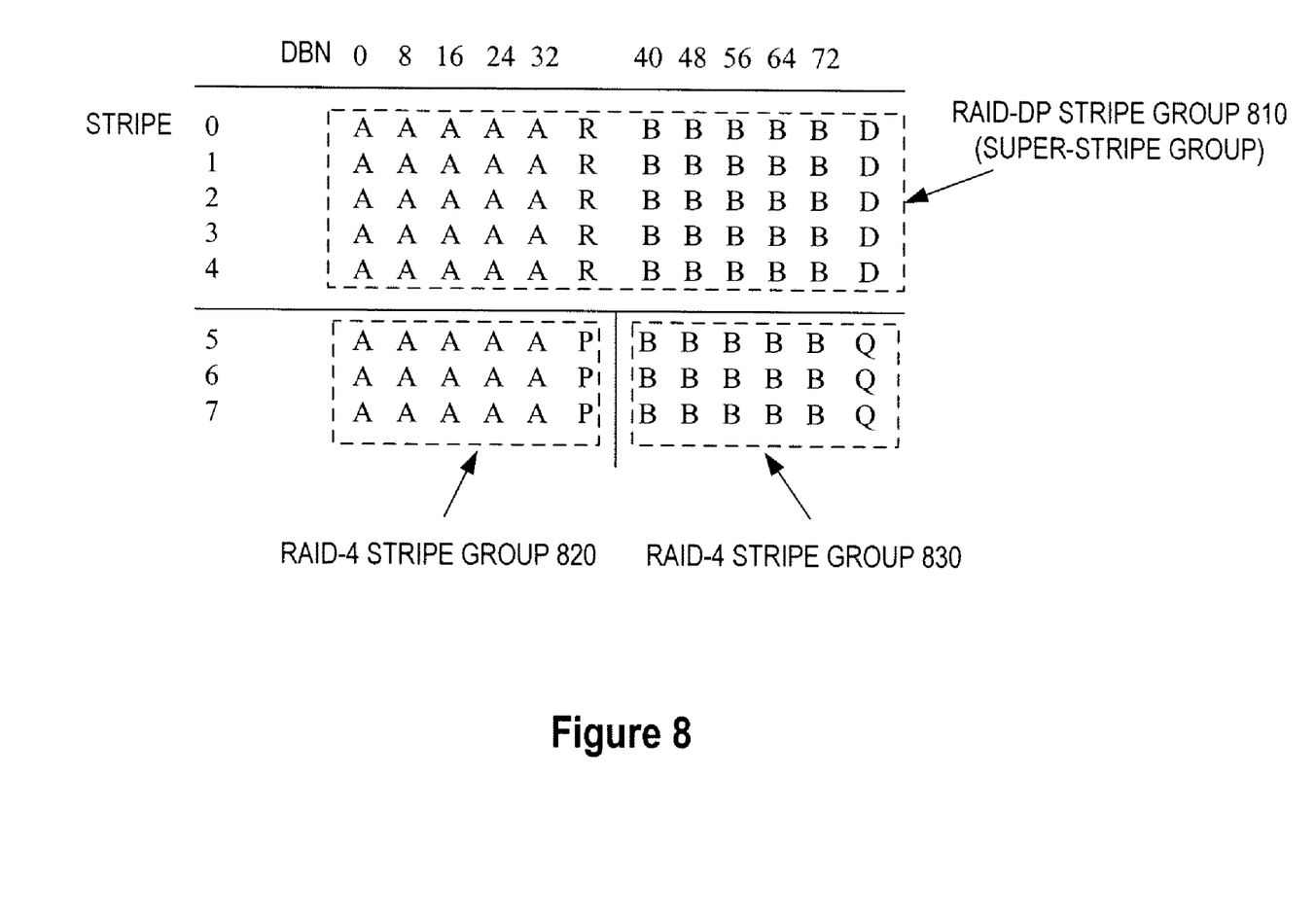
FIG. 8 illustrates an example of stripe groups that are formed during a merge process.

FIG. 8 illustrates an example of stripe groups that are formed in a merge operation. Referring to FIG. 8, stripes represented by {A, B, R, D} form a RAID-DP stripe group 810. Stripes {A, P} and {B,Q} form two RAID-4 stripe groups 820 and 830. As the merge operation progresses from stripe 0 to stripe 8, membership in each stripe group changes. When the merge operation is completed, all of the nine stripes belong to the RAID-DP stripe group 810.

Figure 9:
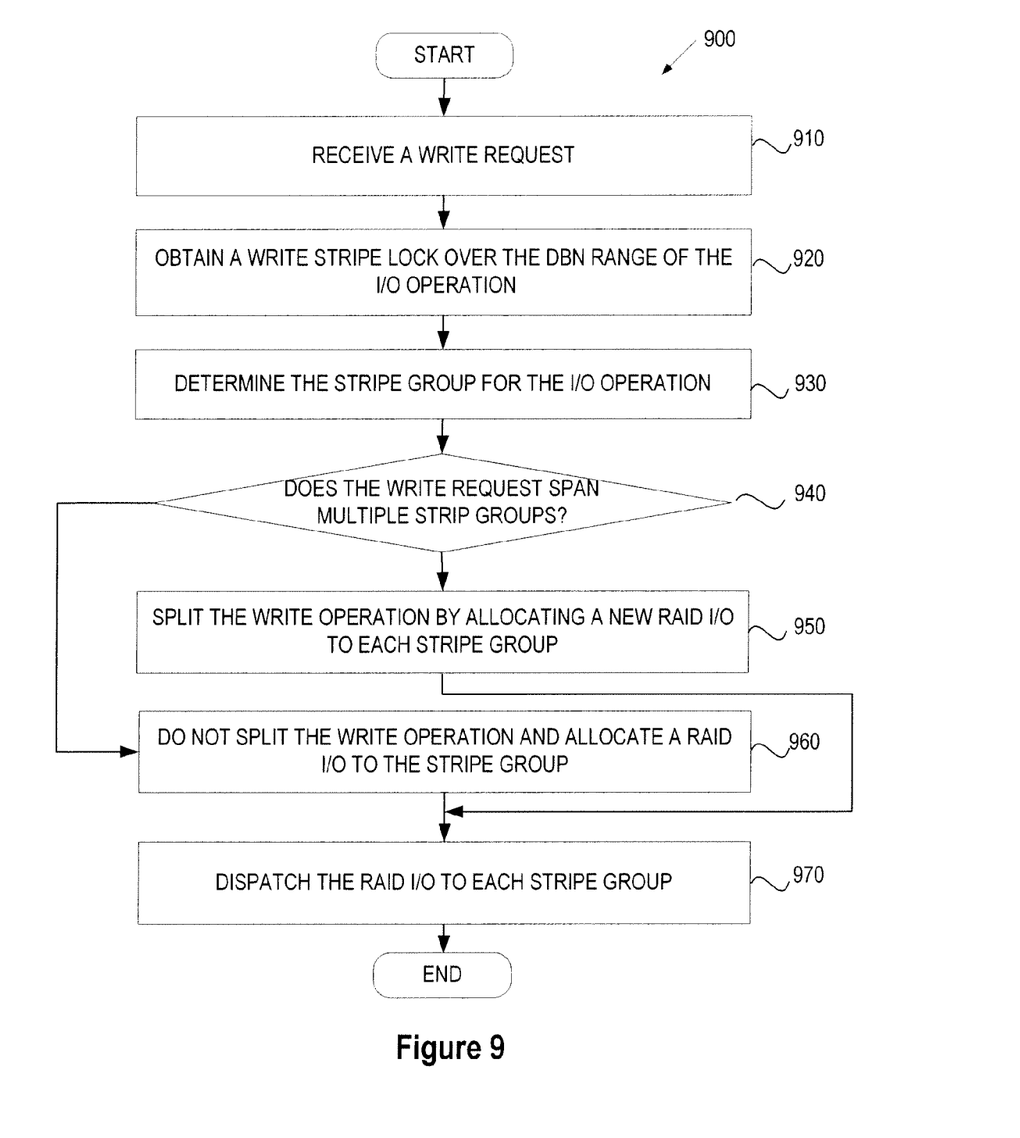
FIG. 9 is a flow diagram illustrating an embodiment of an I/O process.

I/O processing (read/write) of disk blocks can be explained in connection with FIG. 9. FIG. 9 is a flowchart illustrating a process 900 for allocating write operations in accordance with an embodiment of the present invention. Read operations can be similarly implemented. Details not germane to the present invention are omitted from the following description. The process 900 may be performed by hardware or software. In one embodiment, the process 900 is performed by the storage access layer 35 in the storage operating system 300 of FIG. 3.

At block 910, a write request is received from a RAID client, such as a file system. In response to the write request, at block 920, a write stripe lock is obtained over the DBN range of the I/O operation. At block 930, the stripe groups for the I/O operation are determined. Acquiring the lock before the stripe group determination is necessary to ensure that the stripe group type for the DBN range of the I/O does not change while the I/O is in progress. At block 940, it is determined whether the write request spans multiple stripe groups. If the write request spans multiple stripe groups, at block 950, the write operation is split up by allocating a new RAID I/O operation to each stripe group. If the write request is within one stripe group, at block 950, the write operation does not split, and a RAID I/O operation is allocated to the one stripe group. At block 960, the allocated RAID I/O operation is dispatched for each stripe group.

In the scenario of FIG. 8 above, an I/O targeted for stripes 3-6 is split into three RAID I/O operations, one for each stripe group. The first RAID I/O operation corresponds to stripes 3 and 4, which belong to the merged RAID-DP stripe group 810. I/O processing for this stripe group involves the computation of both the row (R) parity and the diagonal (D) parity, as defined by the RAID-DP protocol. A second RAID-I/O operation corresponds to stripes 5 and 6 and is for the stripe group 820 which represents the RAID-4 group {A, P}. The row parity (P) is computed as part of the I/O processing. A third RAID-I/O operation also corresponds to stripe 5 and 6, and is for the stripe-group 830 which represents the RAID-4 group {B, Q}. The row parity (Q) is computed as part of the I/O processing. The low-level I/O mechanism for each stripe group type (RAID-4, RAID-DP) remains the same as the conventional I/O mechanism used for the same RAID group type.

Thus, dynamic reconfiguration of RAID groups in a storage system has been described. Software to implement the dynamic reconfiguration described herein may be stored on a computer-readable medium. A "computer-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a computer-readable medium includes recordable/non-recordable media (e.g., read-only memory (ROM); random access memory (RAM); magnetic disk storage media; optical storage media; flash memory devices; etc.), and the like.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable medium" includes any type of volatile or non-volatile storage device that is accessible by a processor. The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
   receiving an indication of a change to at least one of data characteristics and system characteristics of a storage system, the change comprising a change in data criticality, wherein data criticality reflects an importance of data; and
   in response to the change, dynamically reconfiguring Redundant Array of Inexpensive Disks (RAID) groups of the storage system by reorganizing storage devices in the RAID groups, wherein dynamically reconfiguring the RAID groups comprises:
      if the indication is an increase in data criticality, dynamically merging a first RAID group with a second RAID group to form a merged RAID group that includes the storage devices of the first RAID group and of the second RAID group; and
      if the indication is a decrease in data criticality, dynamically splitting one of the RAID groups into one or more split RAID groups, the one or more split RAID groups including the storage devices of the one of the RAID groups.

2. The method of claim 1, wherein dynamically reconfiguring RAID groups further comprises:
   concatenating disk block numbers of the storage devices in at least two of the RAID groups to form an address space of a merged RAID group.

3. The method of claim 1, wherein dynamically reconfiguring RAID groups further comprises:
   dynamically reconfiguring a first stripe of a first RAID group of the RAID groups concurrently with I/O operations on a second stripe of the first RAID group, wherein each of the first stripe and the second stripe contains data blocks from each of the storage devices in the first RAID group.

4. The method of claim 1, wherein dynamically reconfiguring RAID groups further comprises:
   changing the number of the storage devices in a storage device container of the storage system in which the RAID groups reside, according to fault tolerance levels of the RAID groups before and after the reconfiguring.

5. The method of claim 1, wherein dynamically reconfiguring RAID groups further comprises:
   changing a fault tolerance level of at least one of the RAID groups while maintaining the number of the storage devices in a storage device container of the storage system in which the RAID groups reside.

6. The method of claim 1, wherein dynamically reconfiguring RAID groups further comprises:
   splitting an I/O operation on a first RAID group into multiple I/O operations during reconfiguration of the RAID groups, at least one of the multiple I/O operations performed on a stripe of the first RAID group that has completed the reconfiguration and at least another one of the multiple I/O operations performed on another stripe of the first RAID group that has not completed the reconfiguration.

7. A computer-implemented method comprising:
   receiving an indication of a change in data criticality in a storage system, wherein data criticality reflects an importance of data;
   reconfiguring Redundant Array of Inexpensive Disks (RAID) groups of the storage system by reorganizing storage devices in the RAID groups, wherein reconfiguring the RAID groups comprises:
      if the indication is an increase in data criticality, dynamically merging a first RAID group with a second RAID group to form a merged RAID group that includes the storage devices of the first RAID group and of the second RAID group; and
      if the indication is a decrease in data criticality, dynamically splitting one of the RAID groups into one or more split RAID groups, the one or more split RAID groups including the storage devices of the one of the RAID groups; and
   performing I/O operations to the RAID groups concurrently with the reconfiguring.

8. The method of claim 7, wherein reconfiguring RAID groups further comprises:
   changing the number of the storage devices in a storage device container of the storage system in which the RAID groups reside, according to fault tolerance levels of the RAID groups before and after the reconfiguring.

9. The method of claim 7, wherein reconfiguring RAID groups further comprises:
   changing a fault tolerance level of at least one of the RAID groups while maintaining the number of the storage devices in a storage device container of the storage system in which the RAID groups reside.

10. The method of claim 7, wherein reconfiguring RAID groups further comprises:
    creating a new RAID group while maintaining the number of the storage devices in the RAID groups and the fault tolerance level of the RAID groups.

11. A storage system comprising:
    a plurality of storage devices, which include data storage devices to store data and parity storage devices to store parity bits of the data; and
    a storage server coupled to the plurality of storage devices, the storage server to:
       receive an indication of a change to at least one of data characteristics and system characteristics of a storage system, the change comprising a change in data criticality, wherein data criticality reflects an importance of data; and
       in response to the change, dynamically reconfigure Redundant Array of Inexpensive Disks (RAID) groups of the storage system by reorganizing the data storage devices and the parity storage devices in the RAID groups, wherein dynamically reconfiguring the RAID groups comprises:
          if the indication is an increase in data criticality, dynamically merging a first RAID group with a second RAID group to form a merged RAID group that includes the storage devices of the first RAID group and of the second RAID group; and
          if the indication is a decrease in data criticality, dynamically splitting one of the RAID groups into one or more split RAID groups, the one or more split RAID groups including the storage devices of the one of the RAID groups.

12. The storage system of claim 11, wherein the storage server is to dynamically reconfigure a first stripe of a first RAID group of the RAID groups concurrently with I/O operations on a second stripe of the first RAID group, wherein each of the first stripe and the second stripe contains data blocks from each of the storage devices in the first RAID group.

13. The storage system of claim 11, wherein the server is to concatenate disk block numbers of the storage devices in at least two of the RAID groups to form an address space of a merged RAID group.

14. The storage system of claim 11, wherein the server is to change the number of the storage devices in a storage device container of the storage system in which the RAID groups reside, according to fault tolerance levels of the RAID groups before and after the reconfiguring.

15. The storage system of claim 11, wherein the server is to change a fault tolerance level of at least one of the RAID groups while maintaining the number of the storage devices in a storage device container of the storage system in which the RAID groups reside.

* * * * *